June 24, 1969          B. B. ELLIS          3,451,130
METHOD OF MAKING A MAGNETIC CORE STRUCTURE
FOR INDUCTIVE APPARATUS
Original Filed Oct. 10, 1963          Sheet 1 of 3

PRIOR ART

INVENTOR
Belvin B. Ellis
BY
Donald R. Lackey
ATTORNEY

United States Patent Office 3,451,130
Patented June 24, 1969

3,451,130
METHOD OF MAKING A MAGNETIC CORE STRUCTURE FOR INDUCTIVE APPARATUS
Belvin B. Ellis, Pulaski, Pa., assignor to Westinghouse Electric Corporation, Pittsburgh, Pa., a corporation of Pennsylvania
Original application Oct. 10, 1963, Ser. No. 315,300, now abandoned. Divided and this application Mar. 18, 1966, Ser. No. 535,422
Int. Cl. H01f 7/06
U.S. Cl. 29—605                    9 Claims

ABSTRACT OF THE DISCLOSURE

Methods of making a magnetic core for electrical inductive apparatus, which include the steps of providing a plurality of turns of metallic laminations, shaping the turns to provide a magnetic core structure having a plurality of outer corners, with a plurality of spaced discrete bends at each of its outer corners, and stress annealing the magnetic core after shaping.

---

This is a division of application Ser. No. 315,300, filed Oct. 10, 1963, now abandoned which is assigned to the same assignee as the present application.

This invention relates in general to electrical inductive apparatus, and more particularly to magnetic core structures for inductive apparatus.

Wound magnetic core structures of the prior art, such as those shown and described in U.S. Patents 2,972,804 and 2,973,494 granted Feb. 28, 1961, and assigned to the same assignee as the present application, have two yoke portions and two leg portions circumscribing a generally rectangular window or opening. The cores generally have rounded corners on the external periphery. The yoke and leg portions which circumscribe the window or opening in the magnetic core should have straight sides and the core window should have well formed sharp corners to allow associated coils to properly fit the core legs and window.

In an attempt to maintain the desired or as-formed shape of the magnetic core during and after the stress annealing operation to remove the stresses induced by the forming operation, it is necessary to resort to expensive alloy steel holding fixtures, such as caps and plates. Upper and lower caps locate and hold the outer periphery of the core, as well as the core window. The plates extend from the upper to the lower cap, along the legs of the magnetic core. Each magnetic core size requires its own complete set of caps and plates, which is an added expense each time a new core design is put into production. Further, maintenance of the caps to maintain them in the desired shape after repeated heating and cooling cycles is extensive.

The added expense of the caps and plates and the resulting design inflexibility once the fixtures are obtained, are not the only problems associated with the prior art design. Even using the fixtures or supports, the round outer corners of the magnetic core cause a certain amount of spring back, resulting in bowing of the core legs, rounding of the core ends and rounding of the inner corners of the core window. The spring back problem is aggravated by the continual usage of the same holding fixtures, as they are warped by the thermal cycling they are subjected to.

Any change in the core shape after the anneal cycle from the position it occupies during the anneal, or stressing the core in any way, substantially increases the core losses. Bowing of the core legs causes stress to be produced in the core by pressure from end frames, thus increasing the core losses. Bowing or rounding of the core ends allows laminations to slip around the corners during assembly with the associated electrical coil, into positions other than those occupied during the stress relief, thus stressing the laminations and increasing the core losses. Rounded inner corners prevent tighter design or close fit of cores and coil, thus the coils do not properly fit the core legs and windows. Also, on core designs using a lapped joint closure, such as the stepped-lapped design taught by the U.S. patents hereinbefore referred to, incomplete closure causes joint losses to be substantially increased.

Another disadvantage of the holding fixtures is the fact that the annealing furnace must be sized larger than dictated by the thermal requirements of the cross themselves, in order to heat the mass of the holding fixtures. Further, the caps shield the cores from heat radiation during the annealing process, requiring a longer heat treating cycle to get the cores heated uniformly to the desired annealing temperature.

Accordingly, it is an object of this invention to provide a new and improved magnetic core structure for electrical inductive apparatus.

Another object of the invention is to provide a new and improved magnetic core structure that will maintain the desired shape before and after the annealing cycle.

A further object of the invention is to provide a new and improved magnetic core structure that can be assembled around its associated coil without the laminations assuming positions different from those occupied during the annealing cycle.

Still another object of the invention is to provide a new and improved magnetic core structure that can be assembled with its associated coil without substantially increasing the losses of the magnetic core.

Still a further object of the invention is to provide a new and improved magnetic core structure that will allow its associated coil to closely and accurately fit the core legs and window.

Still another object of the invention is to provide a new and improved magnetic core structure that will maintain its desired shape after annealing without the necessity of utilizing external supporting fixtures, and produce a core having a minimum of losses.

Briefly, the present invention accomplishes the above-cited objects by providing a polygonal magnetic core having four major sides and a plurality of die-formed bends, preferably two or three, at the corners instead of round corners, which provides a plurality of additional or minor sides. One bend per corner would have the disadvantage of increasing the weight of average size cores by 6 to 7%, thus increasing the cost of the cores as well as increasing the core losses. By using two or three bends per corner, substantially no increase in core material is required, as the core corners closely conform to round corners. The angles of all of the bends of the corners are alike, and sharp enough to eliminate bowing and spring back as a problem. The inner corners of the core window are square and sharp and accurately die-positioned. After die-forming the core legs are slightly "bowed-in" instead of being "bowed-out" as in the prior art, thus the only fixture required during the heat treating cycle is a spreader type fixture in the internal core window. It is unnecessary to use expensive external and internal supports such as caps and plates. The sharp bends at the corners cause all of the laminations to "line up" properly after assembling the coil on the core, thus eliminating slipping or incomplete closure of the joint in the core. Further, since the core is die-formed, the coils may be assembled quickly and accurately without stressing the core and increasing its losses. The absence of external fixtures allows the cores to be more rapidly heated to the annealing temperature, and reduces the furnace size necessary to heat the cores, as there are no massive external fixtures to also heat to the annealing temperature.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which.

Figure 1:
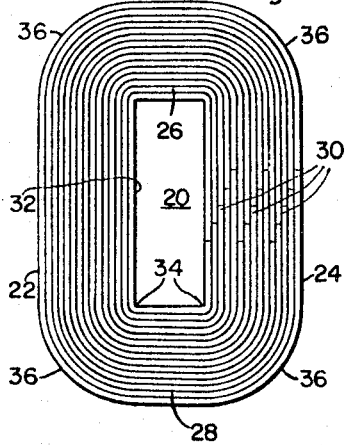
FIGURE 1 is a view in end elevation of a wound core having straight core legs and a window with square and sharp corners.
Figure 2:
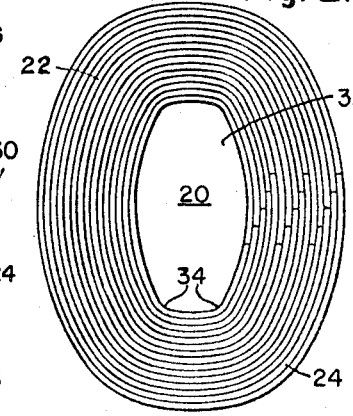
FIG. 2 is a view in end elevation of a wound core, before and after anneal, which had not had the benefit of external supporting fixtures.

Referring now to the drawings, and FIG. 1 in particular, there is shown a front elevation of a typical wound core 20 of the prior art, having legs 22 and 24 separated by upper and lower yokes or ends 26 and 28, respectively. The core 20 may have a joint 30, in one of the legs of the core 20, such as in leg 24 as shown, or in the upper or lower yoke portions 26 and 28, to facilitate introduction of the associated electrical coil. The joint 30 may be of the stepped lap design as shown, which is described in the U.S. patents hereinbefore referred to, a butt-lap joint, or any other type of joint. The core shown in FIG. 1 is of the desired shape to insure that the core will have the lowest possible losses, having straight legs 22 and 24 and a window 32 formed by legs 22 and 24 and yokes 26 and 28 which has sharp square corners 34. However, it is extremely difficult to form a core having the configuration of FIG. 1, and have it maintains its as-formed configuration without the aid of external holding means. The round corners 36 of core 20 cause the core to spring back after forming, and assume a shape similar to that shown in FIG. 2. The legs 22 and 24 of core 20 are bowed outward, and the window 32 is poorly shaped, with the corners 34 of the windows 32 becoming rounded. In order to prevent the cores from taking the shape shown in FIG. 2, it is necesary to use some type of external holding fixture such as shown in FIG. 3.

Figure 3:
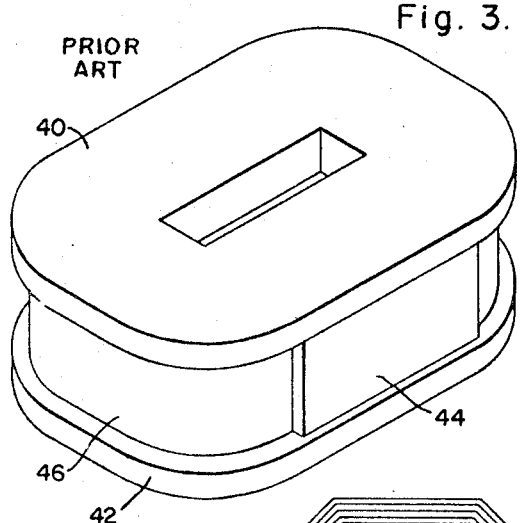
FIG. 3 is a pictorial view of a wound core with external supporting fixtures.

FIG. 3 illustrates one of the prior art methods of holding cores during the stress annealing operation. Upper and lower alloy steel caps 40 and 42, respectively, and side plates 44 position the outer periphery and window of magnetic rore 46 and hold the core during the heat treating cycle. As can be readily seen from FIG. 3, the holding fixture shields the core from radiant heat during the stress annealing cycle, requiring a much longer time to bring the core up to the proper temperature. Also, the mass of the fixtures has to be heated, along with the cores, thus requring a larger furnace capacity than would be required for heating the cores alone.

Figure 4:
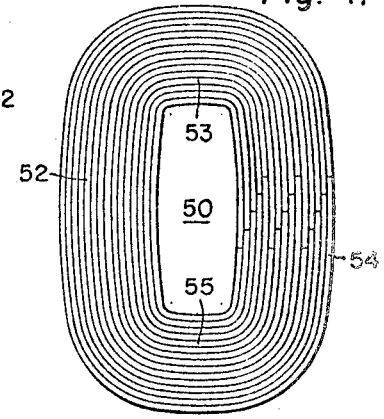
FIG. 4 is a view in end elevation of a wound core after anneal which had been externally supported in a fixture similar to the one shown in FIG. 3.

However, in spite of elaborate and expensive holding fixtures, cores still tend to take a shape after anneal similar to the core shown in FIG. 4. The spring back in the core 50 produces a bow in the legs 52 and 54 and the ends 53 and 55, and the corners 56 of the core window are not square and sharp. This condition is further aggravated by the warpage and growth of the heat treating fixtures after they have been subjected to repeated stress annealing heating and cooling cycles. Further, all cores do not deviate from the desired shape in the same degree, so there is no uniformity in the configuration of the cores. In order to manufacture the coils so they will fit all of the cores, they must necessarily be made so they will fit the worst condition of coil deviation. This causes poor fits between the majority of cores and coils between the core legs and windows, resulting in increased losses. Bowed core legs cause stresses to be produced in the core from pressure from end frames and coils, which further adds to the core losses. The rounding or bowing of the core ends allows laminations to slip during assembly from positions other than those occupied during the stress anneal, causing the laminations to be stressed, and increase the core losses. The core joints are difficult to close after assembly with the coil so that the desired amount of overlap is seldom maintained, adding to the losses of the core joint. The rounded window corners prevent close fit of the coils and cores, adding still further to the core losses.

Figure 5:
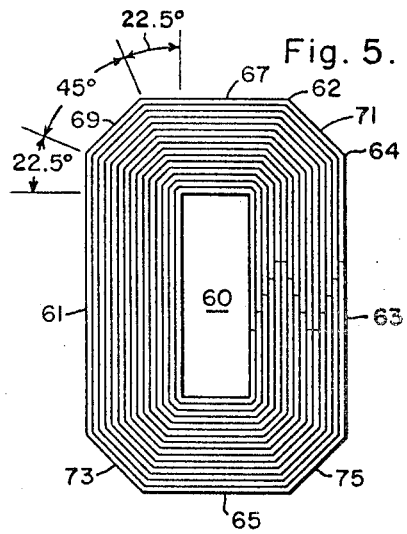
FIG. 5 is a view in end elevation of a die-formed wound type core after anneal, having straight legs and a window having square, sharp corners.
Figure 9:
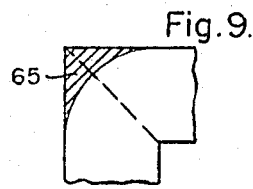
FIG. 9 is a fragmentary view of the end elevation of a wound type core having one bend at each corner.

A core design which eliminates the requirement of expensive external holding fixtures during the heat treating cycle and produces a core having straight legs and yokes, a window having square sharp corners and a core that has a minimum of losse, without substantially increasing the core weight is shown in FIG. 5. The polygonal core design shown in FIG. 5 is die-formed by a method which will be described in detail hereinafter, so there will be substantially no deviation in core configuration from one core to the next. More specifically, the polygonal core 60 has four major sides 61, 63, 65 and 67; and is die-formed to create a plurality of discrete bends 62 and 64 at each corner. Thus, a plurality of smaller or minor sides 69, 71, 73 and 75 are formed. The spring back in the cores of the prior art is caused by the rounded corners used in core structures of the prior art. Progressively, from the inside to the outside, there is an increasing radius of corners that causes increasing spring back of the laminations. The larger the radius, the greater the spring back tendency. A round corner has an infinite number of bends, with no discrete bends. The minimum spring back would be the situation where each corner has one discrete bend, as shown in the fragmentary view in FIG. 9. However, one bend per corner would cause a 6 to 7% increase in the core, causing a corresponding increase in the cost of the material for each core, as well as increasing the core losses. The material shown in the cross-hatched area 65 of FIG. 9 would all be excess material.

Figure 6:
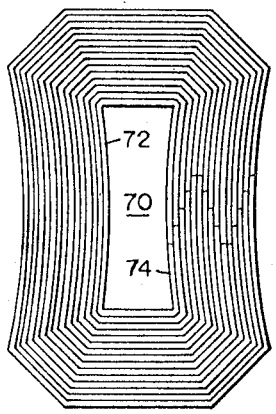
FIG. 6 is a view in end elevation of a wound type core after die-forming and before anneal, having a plurality of bends at the core corners and the core legs bowed slightly inward.
Figure 7:
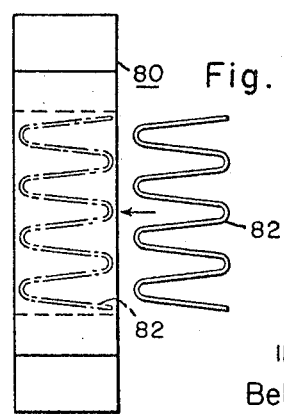
FIG. 7 is a view in side elevation, partially in phantom showing the wound type core of FIG. 5 prior to anneal, with a spreader type internal fixture.

FIG. 5 illustrates a polygonal core 60 having two discrete bends, 62 and 64, per corner, which causes the core corners to closely conform in shape to round corners, thus wasting a negligible amount of material and still providing a core which has substantially no tendency to spring back. It has been found desirable to actually give the legs of the die-formed core a reverse bend during the die-forming operation, as shown in FIG. 6. FIG. 6 shows a core 70 in which the legs 72 and 74 bow slightly inward. Then, just prior to the stress annealing cycle, a simple, internal spreader type fixture may be added to the core window to straighten the core legs, such as spreader fixture 82 shown in FIG. 7. FIG. 7 shows the end view of a core 80, with the spreader fixture 82 being shown in position in the core window with broken lines. The core stresses are thus relieved during stress anneal while pressing against the spreader fixture 82, producing a core having the appearance of core 60 shown in FIG. 5. Expensive external caps and plates, as shown in FIG. 3, are unnecessary.

Figure 8:
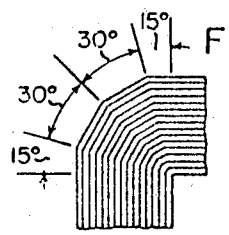
FIG. 8 is a fragmentary view of the end elevation of a wound type core, having three bends at each corner.

A core having two discrete bends per corner may have one bend formed 22.5 degrees from the vertical and the other 22.5 degrees from the horizontal, as shown in FIG. 5. If three discrete bends per corner are utilized, one bend may be made at 45 degrees, another at 15 degrees from the vertical and the remaining bend 15 degrees from the horizontal, such as shown in FIG. 8. Although more discrete bends than 3 per corner may be utilized, it is not considered practical since the minor savings in material are more than offset by the increased amount of spring back introduced by additional bends.

Figure 10:
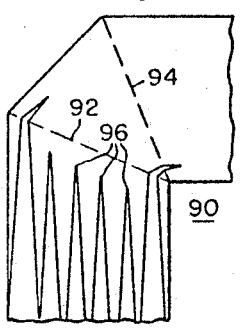
FIG. 10 is a fragmentary view of the end elevation of a wound type core showing how the joints of some groups of laminations may be disposed to coincide with one of the corner bends to "lock" the core together.

Although, as hereinbefore stated, any type of core joint may be utilized, the improved core structure disclosed herein is particularly well suited to the stepped-lap type joint, which will be described in detail hereinafter. When the stepped-lap type joint is used, some stepped-lap groups of laminations may be brought around the corner so as to cross one or more of the corner bends, as shown in FIG. 10, thus "locking" the core together. More specifically, FIG. 10 is a fragmentary view showing the corner of a core 90 which has bends 92 and 94. The thin, pencil-like extensions 96 represent groups of laminations, with each group of laminations being stepped-lap. The end groups of laminations are shown crossing the bends 92 and 94, which provide a locking influence upon the joint, preventing it from opening after it has been disassembled and reassembled through the window of its associated electrical coil.

Figure 11:
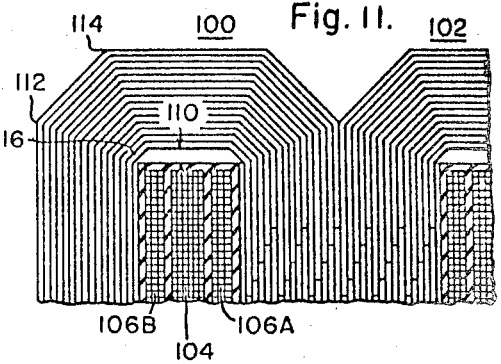
FIG. 11 is a fragmentary view, in cross section, of the end elevation of wound type cores and associated coils, showing how the die-formed cores could allow a predetermined amount of space to be provided for voltage clearance from the core end to the inner high voltage winding on the coil.

FIG. 11 shows a portion of two magnetic cores and high and low voltage windings, in section, illustrating an embodiment of the invention whereby voltage clearance is provided from the core end to the high voltage winding on the core. More specifically, magnetic cores 100 and 102 are shown in assembled relationship with high voltage winding 104, and inner and outer low voltage windings 106A and 106B, respectively. A clearance or gap 110 is maintained between core 100 and high voltage winding 104 by shaping the portion of the die that forms the window such that the bends 112 and 114 do not come to a point at the window corner, but leave a space 116 which causes a polygonal window to be formed. Since the cores are deformed, this space 110 is accurate and repeatable from core to core. Thus the coil may be manufactured to closely fit the core, and the coil height may be such that the gap 110 formed by leaving space 116 between the bends 112 and 114 will provide the necessary voltage clearance.

Figure 12:
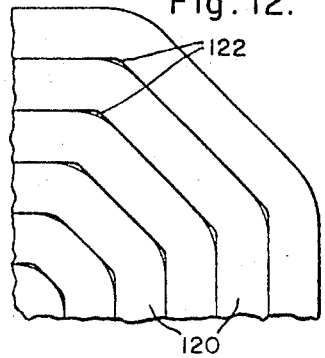
FIG. 12 is a fragmentary view of the end elevation of a wound type core showing that individual groups of laminations may be cut or sheared separately and then bent and put together in a composite core structure.

Instead of die-forming the complete core in one operation, individual groups of laminations may be formed separately and then assembled so the bends in the corners line up. FIG. 12 is a fragmentary view illustrating how a core corner would look when lamination groups 120 are separately bent and then assembled. The substantially triangular shaped openings 122 are advantageous, as they provide some looseness or tolerance during manufacture and assembly. A method of providing tolerances or looseness during assembly of a core which is die-formed all at once, is to place spacers made of paper or other combustible material between the groups of laminations such that they will appear in the proper locations at the end of the core after shaping. The spacers will burn out during the stress anneal cycle to provide spaces or looseness during assembly.

Figure 13:
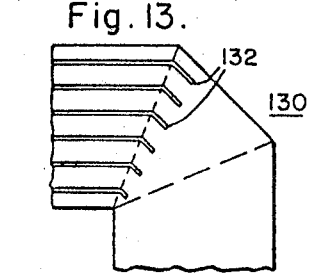
FIG. 13 is a fragmentary view of the end elevation of a wound type core, illustrating how individual laminations can be projected up and around a core end by shifting one lamination from each group of laminations.

FIG. 13 is a fragmentary view of the corner of a core 130 illustrating another embodiment of the invention which will aid in locking the core after assembly and eliminate the necessity of a core band. The end of one lamination 132 from each group of stepped-lap laminations may be shifted around a core end so that the shifted lamination crosses the point where one of the sharp bends is to be made. The sharp bend in the lamination from each group of laminations locks the core joints securely in position.

Figure 14:
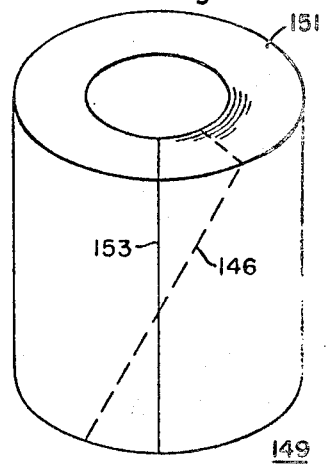
FIG. 14 is a pictorial view of a magnetic core in one of the steps prior to die-forming.

A method of producing magnetic cores embodying the principles of this invention, such as the core shown in FIG. 5, is to wind a plurality of turns 151 of oriented magnetic strip material upon one another, as shown in FIG. 14 to form a core 149. The number of turns 151 and the width of the strip will depend upon the design and capacity of the core. The diameter of the core 149 will be largely determined by the size of the preformed coil or winding with which it is to be utilized. After the core 149 is wound, it is back wound to provide the necessary looseness, and to provide the desired internal and external diameters. The core 149 is then cut, either perpendicular to the side of the strip along solid line 153 as shown, or at an oblique angle thereto, such as along dotted line 146. The oblique angle serves to reduce the magnetic induction at the joint by increasing the joint length.

Figure 15:
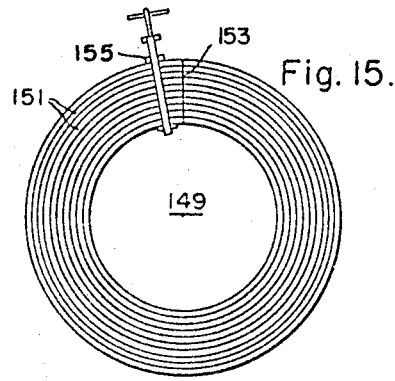
FIG. 15 is a view in end elevation of a wound type core showing a clamp adjacent to a cut.
Figure 16:
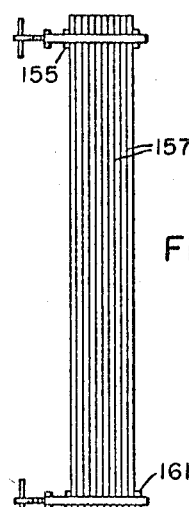
FIG. 16 is a view in end elevation of the core shown in FIG. 15, with a main portion of the core straightened to obtain the laminations in stepped relationship.

If a stepped-lap low loss joint is desired, wound core 149, as shown in FIG. 15, may have its laminations 151 clamped in fixed relationship to one another on one side of the cut 153 by means of a clamp 155. After the clamp 155 has been applied, the laminations of the core are straightened out, as shown generally at 157 in FIG. 16. It will be obvious that the straightening out of the main portion of the core will arrange the laminations 151 in stepped relationship as shown at 159.

If it is desired to step the laminations more in one operation than effected by straightening out the group or stack of laminations, they may be bowed or curved in the opposite direction from the curve in the first winding. Other operations of this type may be introduced to accelerate the making of the core. Such operations will be obvious from the description of the present method.

Figure 17:
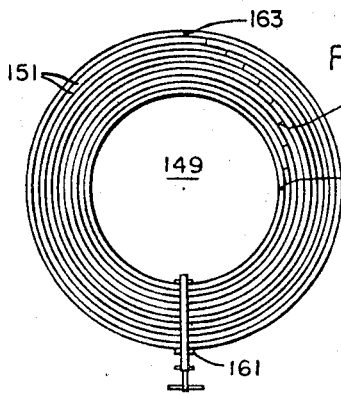
FIG. 17 is a view in end elevation of the wound type core shown in FIG. 16 curled up to form a substantially circular core with the laminations forming stepped-lapped joints.
Figure 17:
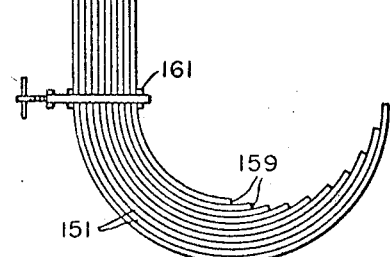

A second clamp 161 is now applied to the other end of the straight section 157 of the core. The clamp 155 is released and the straight section of the core 157 curled up to form a loop as shown in FIG. 17. As the laminations curl up, the portions of the laminations previously in the straight section 157 will move relative to one another and become disposed in stepped relationship to match the stepped laminations shown generally at 159. This "rolling out" operation for arranging lamination ends in stepped arrangement may be repeated a number of times to get the stepped relationship required. For example, when the entire core build up of laminations is rolled out at once, it is possible to get the end portion stepped to the extent of substantially six times the thickness of the laminations by repeating the operation twice. If the laminations are separated into a plurality of groups, a six to one ratio of steplength to lamination thickness may be obtained by rolling out each group once. Also, instead of utilizing a complete rollout, it is possible to obtain the steplength to lamination thickness ratio desired by using a plurality of partial rollouts. By positioning clamp 161 closer to the cut 153, an even greater amount of steplength per rollout may be achieved.

If now the stepped ends of the laminations are fitted together, a series of stepped-lap joints will be formed in the laminations, as shown generally at 163. As will be observed, the laminations are disposed with each lamination forming a joint which is offset or staggered relative to the joint in the next adjacent lamination. The end of one lamination laps the end of the next adjacent lamination. Accordingly, the joint comprises a number of laminations, the ends of which are arranged in a stepped order, the end portions of one lamination lapping the end portion of the next lamination forming a joint which may be described as a stepped-lap joint because of the arrangement of the laminations.

For best results, the ends of the individual laminations should abut one another. The percentage of joint loss caused by space between the lamination ends, however, is a function of the steplength to lamination thickness. For example, with a 2½ to 1 ratio, which is the minimum ratio recommended, it is very important that the laminations abut one another, as any space between lamination ends causes a substantial increase in joint losses. With a ratio of 6 to 1, the space between lamination ends may be as long as the thickness of one or two laminations without substantially increasing the core losses. It is sometimes desirable to go to ratio of approximately 20 to 1, which allows a space the length of several lamination thicknesses without substantially increasing joint losses.

The annealing operation may be performed after the core has been shaped as shown in FIG. 6 and no further operations are to be performed which will introduce stresses in the iron of the core and, therefore, increase the losses in operation. After the core has been shaped, with four major sides and a plurality of minor sides created by two or more discrete bends as described herein, and annealed with a simple spreader fixture disposed in the core window, the joint may be opened and the laminations fitted through the preformed coil and fitted together to form the stepped-lap joint described. It has been found that the bending of the laminations to fit them around the coil is not severe enough to appreciably strain the material. Therefore, the losses of the core in operation are not greatly increased by the assembly operation.

Figure 18:
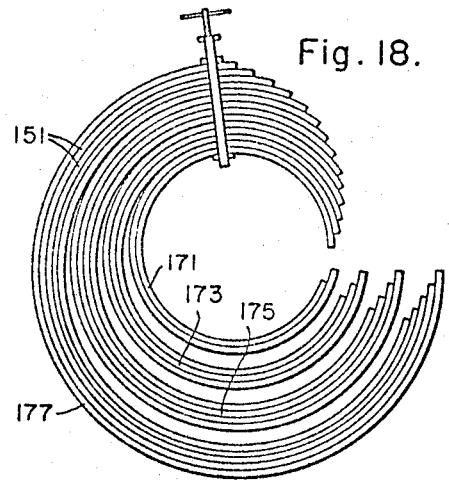
FIG. 18 is a view in end elevation of a wound and split core showing the laminations separated into groups with the ends disposed in stepped relationship.

FIG. 18 illustrates how laminations may be arranged in groups. In this particular illustration, there are four groups, 171, 173, 175 and 177 shown. Group 171 has only two laminations, group 173, three; group 175, four; and group 177, five. However, this is only for convenience and illustration. The groups 171 and 177, inclusive, may include as many individual laminations as the designer may find preferable for his building operations and final product. In practice, it is common to utilize groups having from 15 to 30 laminations.

Since the laminations are all of the same gauge, standard jigs and devices may be made which will readily separate the desired number of laminations required for each group from the body of the core. When the laminations have been separated into the groups of a desired size, they may be manipulated in the manner described hereinbefore, either as individual groups, or as a whole to arrange the individual laminations in stepped relationship.

If the groups of laminations are arranged in individual groups to get the required stepped relationship of the individual laminations, they may be assembled by superimposing the groups on one another in the relationship in which they were wound. If all the groups have been arranged while held together but with the groups kept separated by a jig or other device, then they are ready to be adjusted to locate the joints as desired.

Assuming now that the groups have been arranged to get the laminations 151 in the required stepped relationship as individual groups, then group 173 will be superimposed upon group 171 when the stepped-lap joints of the groups are substantially aligned. The same practice will be followed with groups 175 and 177. The result is that the stepped-lap joints will all now be located so that when the core is shaped as shown in FIG. 5, the stepped-lap joints lie within a straight section of the core. This greatly facilitates the holding of the members making the joint together and results in a low loss joint.

Figure 19:
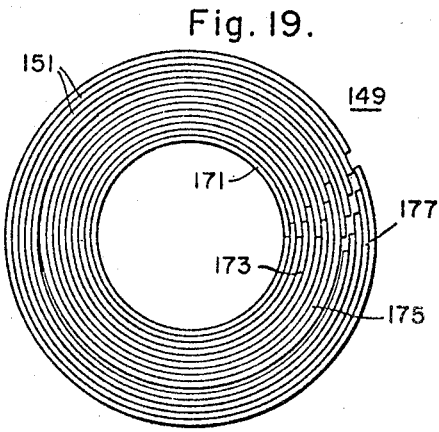
FIG. 19 is a view in end elevation of a core showing the laminations matching as they are brought end to end.
Figure 20:
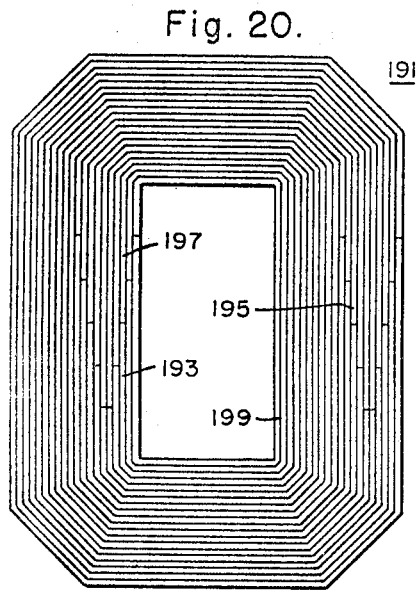
FIG. 20 is a view in end elevation of a wound type core illustrating joints disposed in more than one location throughout the core.

Instead of having the joints of groups 171, 173, 175 and 177 line up as shown in FIG. 19, it may be desirable to arrange the groups so that the joints will fall within two or more of the straight portions of the core after die-forming. For example, FIG. 20 illustrates a polygonal core 191 in which stepped-lap joints 193 and 195 are disposed on legs 197 and 199, respectively. Distributing the joints into a plurality of locations makes the core 191 more compact, as the core doesn't completely open at any one location. An alternative method of forming the core with the joints already distributed to different predetermined positions in the coil, is to form the core with the joints as shown in FIG. 15, and then after disassembling the core in groups of laminations, and the desired joint pattern is formed in each group, reassembling the core with the joints of a first portion of groups in one location and the joints of a second portion of groups in another location. If the angle of the cut through the core was oblique to the edge of the strip, as hereinbefore described, the groups of laminations could be turned over on alternate groups so that the oblique cuts on adjacent groups are oppositely slanted. The assembled core would appear similar to the core shown in FIG. 19, except joints would also appear in some other predetermined portion.

Figure 21:
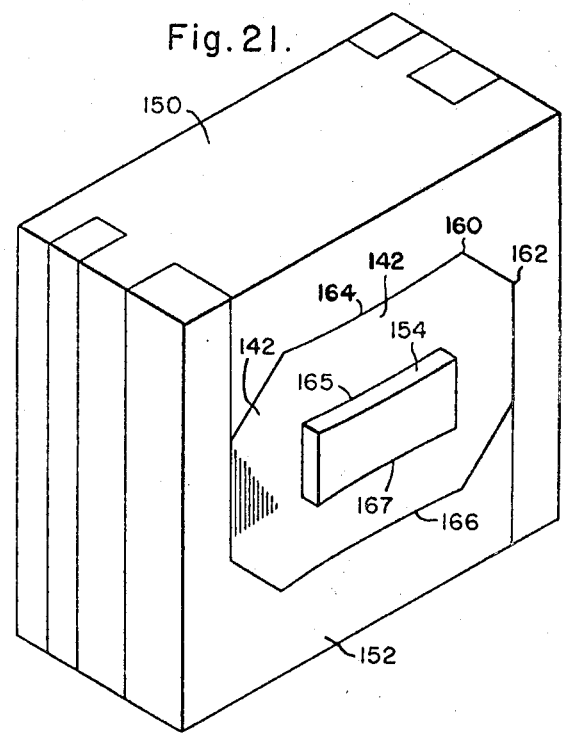
FIG. 21 is a pictorial view illustrating a magnetic core being formed in a die.

The core 149, as shown in FIG. 19, is then die-formed or shaped to obtain the discrete sharp bends at each corner, in a die arrangement such as shown in FIG. 21. More specifically, FIG. 21 is a pictorial view of a die arrangement having upper and lower sections, 150 and 152, respectively, with inner mandrel or internal die 154. In practice, a three piece inner die 154 has been found to produce excellent results. The inner piece of the die is slightly wedge shaped to produce an end-wise movement of die 154 during the forming operation. Other internal die arrangements, however, may be equally suitable. The core 142 is placed between the upper and lower die sections 150 and 152 when the die sections 150 and 152 are in an open position. The die sections are then closed by any appropriate means, such as a hydraulic press. At an appropriate time during the forming of core 142, the inner die mandrel 154 is inserted into the opening of core 142, which forms accurate, sharp corners in the core window. The upper and lower die sections 150 and 152 are appropriately shaped to form the desired number of sharp bends 160 and 162 at each corner of the core 142. The laminations seem to flow or "extrude" into the corners towards the end of the forming cycle forming well defined sharp bends 160 and 162. The upper and lower die sections are designed with a slight curve at locations 164 and 166, and the internal die 154 has a similar curve at locations 165 and 167, so that the legs of core 142 are given a "reverse" bend. In other words, the legs of core 142 are bent inward so that the only fixture required during the heat treating cycle is an internal fixture to move the core legs back to the straight configuration, as shown in FIG. 7. The core 142, after forming and after an internal "spreader" fixture has been placed in the core window, is stress relieved using conventional heat treating practice which is well-known in the art.

Figure 22:
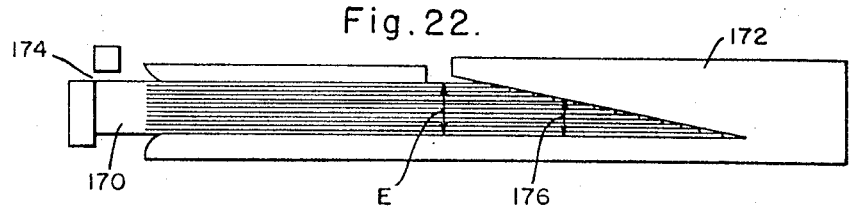
FIG. 22 is a front elevation showing how the individual laminations of a wound type core may be sheared to the proper length preparatory to forming the magnetic core structure.

Another method of forming the core is to substitute shearing for the winding, back winding and cutting method hereinbefore described. The laminations 170 may be sheared while against an angled stop, as shown in FIG. 22, which, by selecting the proper angle 176 will automatically provide the difference in length of the laminations 170 to provide the desired joint pattern. The end of a continuous coil of oriented magnetic strip material is introduced through the blade opening 174 until the end intersects the angled stop 172. The strip is sheared at point 174. New strip then moves forward over the previously sheared strip until the newly sheared end intersects the stop 172 and the strip is again sheared. This process continues until the angled stack of laminations 170 is built up to the desired height E. This device automatically compensates for variations in strip thickness, since it is the correct angle of shearing, not an absolute length difference that is desired. If the angle is correct, the proper difference in length of the laminations is automatically provided. When the strip gets thicker, it backs up further on the angled stop 172 and shears with a greater difference in length. When the strip gets thinner, it proceeds further into the angled stop, shearing with less difference in length.

It is important to get the proper angle 176 so that the outer length of periphery of the core bears the proper relationship to the inner length. If two bends per corner are desired the proper angle is that angle whose tangent is one divided by 6.63. The outer length of a polygonal core having an octagonal shape (two bends per corner) is 6.63 times the buildup of laminations E greater than the inner length. For cores with three bends per corner, the proper angle is that angle whose tangent is equal to one divided by 6.43.

Shearing lends itself well to automation, with the whole core being sheared at once, separated into groups to produce the stepped-lap joint, or any other desired joint, and reassembled; or, individual groups of laminations may be sheared and assembled to form the core. The whole core may then be die-formed, to form the sharp corner bends, as shown in FIG. 21 hereinbefore described, or individual groups may be formed and assembled as shown in FIG. 12.

Another method of forming a core having a plurality of discrete sharp bends at each corner is to wind and backwind a core as shown in FIG. 14, die-form as shown in FIG. 21, and stress anneal without cutting the core. The core may be then unwound and sheared into a stepped-lap pattern, or any other joint design, using the corner bends as a means of locating the incremental positions of shearing. The laminations may then be returned to their original stress relieved positions during assembly, with the sharp corner bends aligning the laminations and preventing them from shifting out of place.

Wound magnetic cores constructed according to the teachings of this invention have many advantages over wound magnetic cores of the prior art. Expensive external holding fixtures are not required. Accurate cores having a uniform configuration from core to core, straight legs and yokes, square and sharp corners in the core windows are obtained by merely using a spreader type internal fixture applied to the core window. Thus, the cores may be heated faster in the stress-anneal cycle and the furnace will use less B.t.u. per hour. Further, stresses are not introduced into the core by end frames and coils. The core configuration is accurate and repeatable, allowing close tolerance coils to be assembled thereon without pressure on the core. Thus, the core has substantially lower losses than cores of the prior art. Further, the sharp bends at the core corners prevents slipping of the laminations. The laminations retain the position they occupied during the stress anneal cycle. It is easy to assemble the coil on the core, as it is merely necessary to realign the bends to assure that no stresses have been introduced into the core. Further, joint losses are reduced as the joints are "locked" into position by the sharp discrete corner bends. Adding further to the low losses of the joint, is the fact that there is no possibility of having an incomplete joint closure. By substantially eliminating stress in the core and preventing incomplete joint closure, cores constructed according to the teachings of this invention have been found to have substantially lower losses than core constructions of the prior art. The table below contains data taken from tests comparing cores constructed according to the principles of this invention having two discrete bends per corner and no external fixturing during the heat treating process, with cores constructed according to prior art methods wherein the cores are held by caps during the heat treating process. The cores are for use in 25 k.v.a., 2400 volt transformers and all utilize a stepped-lap joint in one leg of the core having a 20 to 1 ratio of overlap to lamination thickness. The tests were conducted utilizing an induction of 15.72 kilogausses, both before and after being assembled with coils into complete units.

TABLE I.—CORES CONSTRUCTED ACCORDING TO THE PRINCIPLES OF THIS INVENTION VERSUS PRIOR ART CORES

|  | Average T.W. (True Watts) Core | Unit | Percent Increase | Average A.W. (Apparent Watts) Core | Unit | Percent Increase |
| --- | --- | --- | --- | --- | --- | --- |
| Cores Constructed According to this Invention | 92.6 | 97.3 | 4.9 | 130.2 | 144.9 | 11.2 |
| Prior Art Cores | 94.0 | 100.8 | 7.3 | 133.7 | 156.0 | 16.7 |
| Percent Increase | 1.6 | 3.7 |  | 2.6 | 7.7 |  |

It can be seen by examining the table, that the average core T.W. of the prior art cores was 1.6% greater than the average core of T.W. of cores constructed according to the principles of this invention, and the average unit T.W. of prior art cores (cores completely assembled with end frames and electrical coils into complete units) was 3.7% greater than the average unit T.W. of cores constructed according to the teachings of this invention. The percent increase in T.W. of prior art cores from core to unit was 7.3%, while the percent increase from core to unit of cores constructed according to the principles of this invention was 4.9%.

The average core A.W. of prior art cores was 2.6% greater than the average core A.W. of cores constructed according to the teachings of this invention, and the average unit A.W. of prior art cores was 7.7% greater than the average age unit A.W. of cores constructed according to the teachings of this invention. The percent increase of A.W. of the prior art cores from core to unit was 16.7%, while the percent increase of A.W. of cores constructed according to the teachings of this invention was 11.2%.

Thus, cores constructed according to the principles of this invention not only have a lower T.W. and A.W. than cores of the prior art, but the percent increase in both A.W. and T.W. of cores constructed according to the teachings of this invention, from their condition prior to assembly to the assembled condition, is substantially lower than cores of the prior art.

Since numerous changes may be made in the above-described apparatus and different embodiments of the invention may be made without departing from the spirit thereof, it is intended that all matter contained in the foregoing description and shown in the accompanying drawings shall be interpreted as illustrative, and not in a limiting sense.

I claim as my invention:

1. The method of making a magnetic core comprising, providing a plurality of turns of metallic laminations, shaping the turns of laminations into a configuration having a plurality of major sides separated by corners, said corners having at least two discrete bends which form a plurality of additional sides, wherein the shaping deforms said turns of laminations past their elastic limit to retain their bent shape, and stress annealing said turns of laminations after shaping.

2. The method of making the magnetic core of claim 1 including the step of cutting said plurality of turns of laminations after stress annealing, to provide a plurality of single turn laminations.

3. The method of making the magnetic core of claim 1 wherein said plurality of turns of metallic laminations are provided by winding a strip of magnetic material into a core loop, unwinding the core loop after stress annealing, cutting each turn of the magnetic strip material using the discrete bends provided by shaping to determine the cutting location for each turn, and reassembling the cut turns into substantially the same configuration provided by shaping, thereby providing a magnetic core having at least one openable joint and a predetermined joint pattern.

4. The method of making the magnetic core of claim 1 wherein said plurality of turns of metallic laminations are provided by winding a strip of magnetic material into a core loop, and including the steps, prior to shaping, of cutting said core loop to provide a plurality of independent laminations, and shifting the location of the independent laminations in the core loop relative to one another to provide a predetermined joint pattern.

5. The method of making the magnetic core of claim 1 wherein said plurality of turns of metallic laminations are provided by cutting a strip of magnetic material into predetermined lengths, stacking a predetermined number of said lengths of magnetic material with their ends located relative to one another in a predetermined manner, and forming the stack of lengths of magnetic material into the plurality of turns of metallic laminations.

6. The method of making the magnetic core of claim 1 wherein said plurality of turns of metallic laminations are provided by winding a strip of magnetic material into a core loop, and including the steps, prior to shaping, of cutting said core loop to provide independent ring turns, dividing the independent ring turns into groups, displacing the cut in predetermined ring turns in each group relative to the cuts on the other ring turns in the group, to provide a joint in each group having a predetermined pattern, arranging the groups of ring turns into a nested relationship, with the joint in each group having a predetermined relationship relative to the joint in each of the other groups.

7. The method of making the magnetic core of claim 1 wherein said at least two discrete bends in each corner are die-formed.

8. The method of making a magnetic core comprising the steps of winding a magnetic strip into a loop having a plurality of turns, die-forming said loop to provide a magnetic core structure having a plurality of major sides, wherein each major side is separated from each adjoining major side by at least two discrete die-formed bends, said die-formed bends deforming said plurality of turns past their elastic limit to retain their die-formed shape, and stress annealing said die-formed loop.

9. The method of making the magnetic core of claim 8 including the step of cutting said die-formed magnetic core structure to provide at least one openable joint having a predetermined joint pattern.

References Cited

UNITED STATES PATENTS

| | | | |
|---|---|---|---|
| 2,840,889 | 7/1958 | Freegard | 29—605 |
| 2,972,804 | 2/1961 | Ellis | 29—605 |
| 3,008,222 | 11/1961 | Steinmayer | 29—605 |
| 3,107,415 | 10/1963 | Ellis | 29—605 X |
| 3,186,067 | 6/1965 | Somerville | 29—605 |
| 3,200,357 | 8/1965 | Olsen et al. | 29—605 X |
| 3,307,132 | 2/1967 | Ellis | 29—609 X |

FOREIGN PATENTS 451,070   9/1948   Canada.

JOHN F. CAMPBELL, Primary Examiner.

C. E. HALL, Assistant Examiner.

U.S. Cl. X.R.

29—609; 336—217, 227